United States Patent
Fujita et al.

(10) Patent No.: US 6,566,485 B1
(45) Date of Patent: May 20, 2003

(54) WATER-SOLUBLE FIBER AND A METHOD FOR MANUFACTURE THEREOF

(75) Inventors: Takeshi Fujita, Kyoto (JP); Chuzo Isoda, Kyoto (JP); Sejin Pu, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/596,668

(22) Filed: Jun. 19, 2000

Related U.S. Application Data

(63) Continuation of application No. 08/591,243, filed on Jan. 18, 1996, now Pat. No. 6,093,783, which is a continuation-in-part of application No. 08/371,661, filed on Jan. 11, 1995, now abandoned, which is a continuation of application No. 08/065,060, filed on May 20, 1993, now abandoned, which is a continuation of application No. 07/682,055, filed on Apr. 8, 1991, now abandoned.

(30) Foreign Application Priority Data

Apr. 13, 1990 (JP) ................................. 2-98087

(51) Int. Cl.$^7$ ................................. C08G 63/66
(52) U.S. Cl. ....................... 528/301; 428/359
(58) Field of Search .................. 528/76, 906, 301; 428/359

(56) References Cited

U.S. PATENT DOCUMENTS 4,521,586 A * 6/1985 Fujita et al.
6,093,783 A * 7/2000 Fujita et al.

OTHER PUBLICATIONS

J.M.G. Cowie; Polymer: Chemistry and Physics of Modern Materials; 1973; pp. 275–276.*

* cited by examiner

*Primary Examiner*—Rachel Gorr
(74) *Attorney, Agent, or Firm*—Jordan and Hamburg

(57) ABSTRACT

This invention relates to a water-soluble fiber and a method of manufacturing the fiber. The water-soluble fiber of the invention is composed of a high molecular compound with a weight average molecular weight of not less than 10,000, which high molecular compound is obtainable by reacting a polyalkylene oxide compound, which is obtainable by addition polymerization of an ethylene oxide-containing alkylene oxide and an organic compound containing two active hydrogen atoms, with a polycarboxylic acid, an anhydride thereof, a lower alkyl ester thereof, or a diisocyanate and is manufactured by spinning the same high molecular compound. The water-soluble fiber of the invention is not only high in elongation and tensile strength but is readily soluble in water.

4 Claims, No Drawings

WATER-SOLUBLE FIBER AND A METHOD FOR MANUFACTURE THEREOF

This is a continuation, of application Ser. No. 08/591,243, filed Jan. 18, 1996, now U.S. Pat. No. 6,093,783, which is a continuation-in-part of application Ser. No. 08/371,661, filed Jan. 11, 1995, now abandoned, which is a continuation of application Ser. No. 08/065,060, filed May 20, 1993, now abandoned, which is a continuation of application Ser. No. 07/682,055, filed Apr. 8, 1991, now abandoned.

BACKGROUND OF THE INVENTION

The present invention relates to water-soluble fiber and a method for manufacture thereof.

Among the water-soluble fibers heretofore known is polyvinyl alcohol fiber which is generally fabricated into a twisted yarn, woven fabric or non-woven fabric and put to use in a diversity of applications. For example, it has been used for provisional reinforcing or adhesion in a variety of industrial processes.

However, polyvinyl alcohol fiber is not readily soluble in water and requires heating to at least about 80° C. for dissolution, thus being poor in workability. Moreover, when exposed to a temperature over 100° C., it undergoes crosslinking so that dissolution is often made difficult.

SUMMARY OF THE INVENTION

The object of the present invention is to provide a water-soluble fiber which is tough and readily soluble in water at ambient temperature and does not suffer losses in water solubility on exposure to heat and a method for manufacturing the fiber.

The present invention is directed to a water-soluble fiber composed of a high molecular compound with a weight average molecular weight of not less than 10,000, which high molecular compound is obtainable by reacting a polyalkylene oxide compound, which is obtainable by addition polymerization of an ethylene oxide-containing alkylene oxide and an organic compound containing two active hydrogen atoms, with a polycarboxylic acid, an anhydride thereof, or a lower alkyl ester thereof, or a diisocyanate compound.

The manufacture of said water-soluble fiber comprises spinning said high molecular compound.

DETAILED DESCRIPTION OF THE PREFERRED EMBODIMENTS

The polyalkylene oxide compound as a major starting material for the high molecular compound of the present invention is preferably a compound having a weight average molecular weight of not less than 100 and can be prepared by addition polymerization of an ethylene oxide-containing alkylene oxide and an organic compound containing two active hydrogen atoms.

The organic compound containing two active hydrogen atoms includes, inter alia, ethylene glycol, propylene glycol, polyethylene glycol, polypropylene glycol, polytetramethylene glycol, 1,6-hexanediol, bisphenol A, aniline and so on.

The ethylene oxide-containing alkylene oxide includes, inter alia, ethylene oxide and mixtures of ethylene oxide with propylene oxide, butylene oxide, styrene oxide, α-olefin oxides, glycidyl ethers and so on.

The addition reaction of such an alkylene oxide can be carried out in the known manner, and the mode of addition polymerization of ethylene oxide and other alkylene oxides may be optionally random or block.

The polycarboxylic acid, anhydride thereof, or lower alkyl ester thereof, which is reacted with said polyalkylene oxide compound, include, inter alia, phthalic acid, isophthalic acid, terephthalic acid, sebacic acid, dimer acid, pyromellitic acid, etc., anhydrides thereof, and methyl esters, dimethyl esters, diethyl esters, etc. thereof. The preferred are dimethyl terephthalate, dimethyl phthalate, dimethyl isophthalate, dimethyl sebacate, pyromellitic anhydride and so on.

The polyester-forming reaction between said polyalkylene oxide compound and said polycarboxylic acid, anhydride thereof or lower alkyl ester thereof is preferably conducted at 120–250° C. and $10^{-4}$–10 Torr.

The diisocyanate to be reacted with said polyalkylene oxide compound includes, inter alia, tolylene diisocyanate, diphenylmethane diisocyanate, hexamethylene diisocyanate, isophorone diisocyanate, xylylene diisocyanate, 4,4'-methylene-bis-(cyclohexyl isocyanate) and so on.

The urethane-forming reaction between said polyalkylene oxide compound and said diisocyanate is conducted by mixing the starting compounds in an NCO/OH ratio of, for example, 1.5 through 0.5 and heating the mixture at 80 to 150° C. for 1 to 5 hours.

A high molecular compound obtained by reacting a polyalkylene oxide compound with a diphenylmethane diisocyanate has a tendency to be insoluble in water for the following reason.

When preparing a polyalkylene oxide compound, an alkaline metal hydroxide is used, which is usually neutralized with organic acid to give an alkaline metal salt of organic acid. When the polyalkylene oxide compound is reacted with diphenylmethane diisocyanate without removing the salt, a high-molecular compound which is insoluble in water is obtained as the salt works as a catalyst for gelation.

In order to obtain a water-soluble compound, a retardant to inhibit the gelation is employed for the reaction of the polyalkylene oxide compound with diphenylmethane diisocyanate.

The weight average molecular weight of the high molecular compound according to the present invention is not less than 10,000. If the molecular weight is less than 10,000, the fiber will not be sufficiently high in mechanical strength, giving rise to yarn breakage in the spinning process.

This high molecular compound can be processed into fiber by any known relevant technique such as melt-spinning, dry spinning, wet-spinning, etc., although the melt-spinning process is preferred if only from economic points of view.

In the melt-spinning process, the high molecular compound is melted at 50–200° C. in a nitrogen gas atmosphere and extruded from the conventional spinning nozzle.

In this process, such additives as a plasticizer, lubricant, stabilizer, colorant, filler, etc. can be added. According to the intended application, a perfume, fungicide, agrochemical, fertilizer, etc. can also be incorporated.

The water-soluble fiber as spun has large elongation. For example, the elongation of a fiber with a diameter of 10 μm to 5 mm is approximately 500 to 3,000 percent.

After spinning, the fiber may be treated with a sizing or bundling agent in the hydrocarbon series or stretched. When it is stretched in a draw ratio of 5 to 30, its tensile strength is remarkably increased. The stretching may be performed concurrently with spinning.

The fiber thus obtained is subjected to various processings such as twisting and cutting. The fiber can also be constructed into mixed fabrics with other fibers.

The water-soluble fiber according to the present invention is not only high in elongation and tensile strength but is readily soluble in water. Moreover, this water solubility is not appreciably affected by heating. Therefore, as processed into a thread or yarn or a web, the fiber remains tough and self-supporting in application and, yet, can be completely dissolved out swiftly as needed. In this and other ways, this material can contribute to rationalization of various industrial processes.

The following examples and comparative examples are further illustrative of the invention, it being to be understood, however, that the invention is by no means limited thereto but limited only by the claims appended hereto.

EXAMPLE 1

A polyethylene glycol having weight average molecular weight of 10,000 was obtained by addition polymerization of ethylene oxide and ethylene glycol. One hundred parts (parts by weight; the same applies hereinafter) of the polyenthylene glycol and 2.2 parts of dimethyl terephthalate were used to give a polyester compound with a weight average molecular weight of 130,000 (hereinafter referred to as high molecular compound A).

This high molecular compound A was fed to a melt-spinning apparatus, where it was melted at 120° C. in a nitrogen gas atmosphere and extruded through a spinning nozzle at a rate of 50 m/min, rapidly cooled under tension and taken up. A plain-weave fabric was then constructed using a thread-like bundle of ten filaments.

When put in water, this plain-weave fabric disappeared in 15 seconds. On the other hand, the same plain-weave fabric was locally heat-sealed (120° C., 1.5 seconds) to provide a firm local bond. When this fabric was put in water, the whole fabric inclusive of the bond disappeared in 18 seconds.

EXAMPLE 2

One-hundred parts of a polyalkylene oxide compound (weight average molecular weight 20,000) prepared by block polymerization of ethylene oxide (85%), propylene oxide (15%) and bisphenol A was mixed with 0.84 part of hexamethylene diisocyanate and a small amount of dibutyltin dilaurate and the mixture was heated at 100° C. to give a high molecular compound with a weight average molecular weight of 250,000.

This compound was extruded in the same manner as Example 1, cut to 2–3 mm and processed into a nonwoven fabric. Using this nonwoven fabric as a filter, a used vacuum pump oil (containing 0.5% of water) was purified. As a result, the water content was reduced to 0.02% and the oil came clear. This purified oil could be reused with full confidence.

Comparative Example 1

When a plain-weave fabric of polyvinyl alcohol fiber was put in hot water at 80° C., it disappeared in about 10 seconds. In water at 25° C., however, the fabric swelled as its surface was wetted but remained to be dissolved completely as yet even after one hour. On the other hand, the same plain-weave fabric with a heat-sealed local bond remained partially undissolved even in hot water at 80° C.

EXAMPLE 3

The high molecular compound A synthesized in Example 1 was fed to a melt-spinning apparatus, where it was melted at 120° C. and extruded from a 1 mm (dia.) spinning nozzle at a take-up rate of 30 m/min. The resulting monofilament had a diameter of 40 $\mu$m and a tensile strength of 200 kg/cm$^2$.

This fiber could be stretched in a draw ratio of 13 at 20° C. and the stretched fiber had a diameter of 12 $\mu$m and a tensile strength of 390 kg/cm$^2$.

At 50° C., the fiber could be stretched in a draw ratio of 20 to give a filament with a diameter of 9 $\mu$m. The tensile strength of this filament was 550 kg/cm$^2$.

Comparative Example 2

A wet-spun polyvinyl alcohol filament with a diameter of 40 $\mu$m could be stretched only to twice its initial length at 20° C. The stretched filament had a diameter of 28 $\mu$m and a tensile strength of 500 kg/cm$^2$.

It is, thus, apparent that in the case of the water-soluble fiber according to the present invention, its large elongation permits stretching into finer fiber even if the filament as spun is not so fine. Moreover, spinning troubles such as yarn breakage can be prevented in accordance with the invention.

EXAMPLE 6

A polyalkylene oxide compound having weight average molecular weight of 5,000 was obtained by addition polymerization of 1,650 parts of propylene oxide, 3,850 parts of ethylene oxide and 62 parts of dipropylene glycol with 10 parts of calcium hydroxide as a catalyst.

One hundred parts of the polyalkylene oxide compound was put into another vessel and melted at 100° C. After 0.003 parts of benzoyl chloride was added to the melt and the mixture was stirred for 30 minutes, 4.8 parts 4,4'-diphenylmethane diisocyanate was added to the mixture and reacted with the polyalkylene oxide compound for 5 hours to form urethane. A water-soluble compound having weight average molecular weight of 150,000 was obtained.

The water-soluble compound was fed to a melt-spinning apparatus, melted at 120° C., and extruded through a spinning nozzle having a diameter of 1 mm at a speed of 30 mm/min to give a filament with a diameter of 40 $\mu$m and a tensile strength of 220 kg/cm$^2$. When the filament was put into water at 25° C., it disappeared in 15 seconds.

At 20° C., the filament was stretched in a draw ratio of 13 to give a filament with a diameter of 12 $\mu$m and a tensile strength of 420 kg/cm$^2$.

What is claimed is:

1. A water-soluble fiber composed of a high molecular weight compound with a weight average molecular weight of not less than 10,000, which high molecular weight compound is obtained by reacting a polyalkylene oxide compound, which is obtained by addition polymerization of an ethylene oxide-containing alkylene oxide and an organic compound containing two active hydrogen atoms, with a polycarboxylic acid, an anhydride thereof, or a lower alkyl ester thereof, said water-soluble fiber having an elongation of 500 to 3000 percent.

2. A method of manufacturing a water-soluble fiber which comprises spinning a high molecular weight compound with a weight average molecular weight of not less than 10,000, which high molecular weight compound is obtained by reacting a polyalkylene oxide compound, which is obtained by addition polymerization of an ethylene oxide and an organic compound containing two active hydrogen atoms, with a polycarboxylic acid, an anhydride thereof, or a lower alkyl ester thereof, and wherein said fiber as spun or in the course of spinning is stretched at a draw ratio of 5 to 30.

3. The water-soluble fiber of claim 1 which is stretched at a draw ratio of 5 to 30.

4. The method of claim 2 wherein staid fiber as spun has an elongation of 500 to 3000 percent.

* * * * *